(12) United States Patent
Rossi et al.

(10) Patent No.: US 11,685,981 B2
(45) Date of Patent: Jun. 27, 2023

(54) STEEL COMPOSITIONS HAVING IMPROVED ANTI-COKING PROPERTIES

(71) Applicant: VALLOUREC TUBES FRANCE, Boulogne-Billancourt (FR)

(72) Inventors: Valentin Rossi, La Ravoire (FR); Fernando Andres Bonilla Angulo, Poissy (FR); Nicolas Dulcy, Valenciennes (FR)

(73) Assignee: VALLOUREC TUBES FRANCE, Meudon (FR)

( * ) Notice: Subject to any disclaimer, the term of this patent is extended or adjusted under 35 U.S.C. 154(b) by 0 days.

(21) Appl. No.: 17/681,065

(22) Filed: Feb. 25, 2022

(65) Prior Publication Data

US 2022/0389552 A1    Dec. 8, 2022

Related U.S. Application Data

(63) Continuation of application No. 16/074,558, filed as application No. PCT/FR2017/050243 on Feb. 2, 2017, now abandoned.

(30) Foreign Application Priority Data

Feb. 2, 2016 (FR) ...................................... 1650832

(51) Int. Cl.
*C22C 38/50* (2006.01)
*C22C 38/00* (2006.01)
(Continued)

(52) U.S. Cl.
CPC .............. *C22C 38/50* (2013.01); *C21D 1/28* (2013.01); *C21D 9/08* (2013.01); *C22C 38/001* (2013.01);
(Continued)

(58) Field of Classification Search
CPC ..... C22C 38/001; C22C 38/002; C22C 38/02; C22C 38/04; C22C 38/06; C22C 38/42; C22C 38/44; C22C 38/48; C22C 38/50
(Continued)

(56) References Cited

U.S. PATENT DOCUMENTS

| 6,235,238 B1 | 5/2001 | Lecour et al. |
| 6,444,168 B1 | 9/2002 | Lecour et al. |

(Continued)

FOREIGN PATENT DOCUMENTS

| CN | 101660098 | 3/2010 |
| CN | 101680071 | 3/2010 |

(Continued)

OTHER PUBLICATIONS

Taro et al., JPH1157819A machine translation printed on Sep. 21, 2022 and human translation of Table 2, printed on Sep. 26, 2022, Mar. 2, 1999, entire translation (Year: 1999).*

(Continued)

*Primary Examiner* — Humera N. Sheikh
*Assistant Examiner* — Katherine A Christy
(74) *Attorney, Agent, or Firm* — Oblon, McClelland, Maier & Neustadt, L.L.P.

(57) ABSTRACT

Special usage steels, particularly those intended to be in contact with combustion fumes, are described. Tubular components produced based on such steels are also described. The steel both is resistant to the coking phenomenon and has improved mechanical performances. The steel contains in percentage by weight from 0.08 to 0.15% carbon, from 0.4 to 0.8% manganese, from 1.5 to 2.5% silicon, from 0.5 to 2% copper, from 8 to 10% chrome, from 0.5 to 3% nickel, from 0.01 to 0.07% nitrogen, from 0.8 to 1.1% molybdenum, with the remainder being iron and impurities.

11 Claims, 2 Drawing Sheets

(51) Int. Cl.
| | |
|---|---|
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |
| *C22C 38/48* | (2006.01) |
| *C21D 1/28* | (2006.01) |
| *C21D 9/08* | (2006.01) |
| *C22C 38/40* | (2006.01) |

(52) U.S. Cl.
CPC ............ *C22C 38/002* (2013.01); *C22C 38/02* (2013.01); *C22C 38/04* (2013.01); *C22C 38/06* (2013.01); *C22C 38/40* (2013.01); *C22C 38/42* (2013.01); *C22C 38/44* (2013.01); *C22C 38/48* (2013.01)

(58) Field of Classification Search
USPC .......................................................... 428/544
See application file for complete search history.

(56) References Cited

U.S. PATENT DOCUMENTS

| | | |
|---|---|---|
| 2002/0129873 A1 | 9/2002 | Havette et al. |
| 2002/0129876 A1 | 9/2002 | Lecour et al. |
| 2004/0234409 A1 | 11/2004 | Ropital et al. |
| 2005/0279425 A1 | 12/2005 | Havette et al. |
| 2006/0060270 A1 | 3/2006 | Klueh et al. |
| 2012/0085513 A1 | 4/2012 | Oku et al. |
| 2016/0040262 A1 | 2/2016 | Snyder et al. |

FOREIGN PATENT DOCUMENTS

| | | |
|---|---|---|
| EP | 0 949 347 A1 | 10/1999 |
| EP | 1 223 230 A1 | 7/2002 |
| EP | 1 299 569 | 4/2003 |
| EP | 1 403 394 A1 | 3/2004 |
| JP | 58-224148 A | 12/1983 |
| JP | H1157819 | 3/1999 |
| JP | H1157819 A * | 3/1999 |
| JP | 2004-238662 | 8/2004 |
| JP | 2006-265663 A | 10/2006 |
| JP | 2009-068079 | 4/2009 |
| JP | 2009-138265 | 6/2009 |
| WO | WO 02/04689 A1 | 1/2002 |
| WO | WO 2016/010599 A2 | 1/2016 |

OTHER PUBLICATIONS

McKinnon, "Charpy Testing", Jan. 30, 2019, Portland Bolt & Manufacturing Company, URL: <https://www.portlandbolt.com/technical/faqs/charpy-testing/>, pp. 1-5 (Year: 2019).*

Broder Metals Group, "Longitudinal Vs Transverse Impact Testing", Aug. 14, 2017, URL: <https://broder-metals-group.com/news/longitudinal-vs-transverse-impact-testing/>, pp. 1-7 (Year: 2017).*

Iowa State University, "Impact Toughness", Nov. 25, 2021, URL: <https://web.archive.org/web/20211125201834/https://www.nde-ed.org/Physics/Materials/Mechanical/ImpactToughness.xhtml>, p. 1 (Year: 2021).*

International Search Report dated May 2, 2017 in PCT/FR2017/050243 filed Feb. 2, 2017.

U Padhya et al., Analysis of Sulphur, Phosphorus and Silica in Metals, Alloys, Inorganic Compounds and Solvents, 1999, Bhabha Atomic Research Centre, URL: <https://inis.iaea.org/collection/NCLCollectionStore/_Publ ic/31/034/31034492.pdf?r=1&r=1>, Two title pages, i-ii, 1-8, 2 Image pages, 1 Closing page (Year: 1999).

* cited by examiner

STEEL COMPOSITIONS HAVING IMPROVED ANTI-COKING PROPERTIES

CROSS-REFERENCE TO RELATED APPLICATIONS

The present application is a continuation of U.S. Application Ser. No. 16/074,558, filed Aug. 1, 2018. U.S. Application Ser. No. 16/074,558 is a 35 U.S.C. § 371 national stage application of International patent application PCT/FR2017/050243, filed Feb. 2, 2017, which is based on and claims the benefit of priority to French Application No. FR 1650832, filed Feb. 2, 2016. The entire contents of these applications are incorporated herein by reference.

The invention relates to the field of special usage steels, particularly those intended to be in contact with combustion fumes. The invention also concerns tubular components produced from such steels.

Facilities for processing and transformation of petroleum products comprise a plurality of units such as furnaces, tanks, reactors, and chimneys that are interconnected by pipes. The walls of these units and pipes are in large part composed of steel.

Steels adapted for the aforementioned facilities must have mechanical characteristics suitable for the demanding conditions such as high temperatures and high stresses. Otherwise, accelerated aging degrades the properties of the component. Thus, it is accepted that the crystalline structure of steels must be controlled. To that end, ranges of contents for several of the usual chemical elements are indicated in the standards, for example ASTM A335/A335M or EN10216-2. Compliance with the requirements of the standards is highly desirable, not only to avoid obtaining crystalline structures that are incompatible with the desired mechanical properties, but also to obviate the need for numerous long and expensive conformity tests. Moreover, the production of a steel as close as possible to the requirements of the standards makes it possible to improve its acceptability by the industrial sector.

These standards also define families of alloyed steel compositions, the mechanical properties of which are considered, a priori, to be satisfactory for a given application.

In contact with fumes containing carbon, the surfaces of the walls of the aforementioned facilities are subject to carbonaceous deposits, or coke. This phenomenon is called coking.

Coking leads to the development of a carbonaceous layer on the internal walls of facilities. Coke deposits cause pressure losses, decreased heat exchange efficiency between the interior and exterior of the walls, chemical and physical degradation of said walls, overloading of the walls, at least partial obstructions of piping, etc. Thus, the service life of the facilities is limited. It is therefore desirable to limit coking. However, the standards for steels do not provide information about the behavior of steels with respect to coking.

To preserve the facilities, decoking operations must be carried out regularly. These maintenance and cleaning operations are expensive and generally require shutting down the facilities. This reduces the efficiency of the facilities.

It is brown that it is possible to deposit on the surfaces of the steel walls a protective coating that slows the coking. Such coatings can be obtained by the application of a specific composition or by the formation of a surface oxide, for example by passivation. The document WO 2009/152134 describes pipes obtained in this way. Manufacturing such components is complex and expensive. Moreover, such coatings do not eliminate decoking operations. A conventional decoking operation consists of moving a scraper Pipe Inside Gauge (PIG) of appropriate size through the pipes to scrape off and remove the carbonaceous deposits, like chimney sweeping. This operation damages or even completely destroys any protective internal surface of the pipes. Consequently, an operation to deposit a protective coating must be repeated after each decoking operation. This is tedious and costly, particularly once the steel tubular component is assembled with the rest of the facility.

The patent FR 2 776 671 filed by the French Petroleum Institute describes steels intended to be used in manufacturing furnaces and reactors. However, the mechanical strength and impact toughness of such steels are low.

The invention seeks to improve the situation.

The applicant has sought to improve resistance to coking and to preserve the other mechanical properties by steel compositions, the chemical elements of which have selected contents. These contents were unknown but essentially comply with current standards, thus allowing quick implementation by avoiding long qualifying tests. In other words, the applicant has perfected chemical steel compositions that are innovative and compliant with the demanding principles of the standards recognized by the participants in the technical field considered.

To that end, the applicant proposes a steel composition for manufacturing components having improved anti-coking properties, comprising in percent by weight:
  no more than 0.15% carbon (C),
  from 0.3 to 1% manganese (Mn),
  from 1.4 to 3% silicon (Si),
  from 0.5 to 3% copper (Cu),
  from 8 to 10% chrome (Cr).
  from 0.5 to 3% nickel (Ni),
  from 0.01 to 0.07% a nitrogen (N),
  from 0.8 to 1.1% molybdenum (Mo),
  the remainder of the composition essentially comprising iron (Fe) and impurities.

In one embodiment of the invention, the content by weight of other chemical elements does not exceed:
  0.04% aluminum (Al),
  0.025% phosphorus (P),
  0.02% sulfur (S),
  0.02% titanium (Ti),
  0.05% niobium (Nb),
  0.05% vanadium (V),
  0.1% tungsten (W), and
  0.05% cobalt (Co).

In one embodiment of the invention, the content by weight of each of the other chemical elements does not exceed a 0.01%.

In one embodiment of the invention, the carbon content is between 0.08% and 0.15%.

In another embodiment of the invention, the carbon content is between 0.09% and 0.11%.

In one embodiment of the invention, the silicon content is between 1.5% and 2.5%.

In one embodiment of the invention, the copper content is between 0.5% and 2%.

In one embodiment of the invention, the nickel content is between 0.5% and 2.7%.

In one embodiment of the invention, the manganese content is between 0.4% and 0.8%.

In one embodiment of the invention the nitrogen content is between 0.02% and 0.05%.

In one embodiment of the invention, the aluminum content is between 0.005% and 0.03%.

In one particular embodiment of the invention, the content by weight of impurities does not exceed:
0.025% phosphorus (P),
0.02% sulfur (S),
0.02% titanium (Ti),
0.05% niobium (Nb),
0.05% vanadium (V),
0.1% tungsten (W), and
0.05% cobalt (Co).

Preferably, among the impurities, phosphorus (P) and sulfur (S) are chosen. More preferably, among the impurities, the content by weight of phosphorus (P) does not exceed 0.025% and the content by weight of sulfur does not exceed 0.02%.

According to a particular embodiment of the invention, the composition of steel for manufacturing components having improved anti-coking properties consists of, in percentage by weight:
no more than 0.15% carbon (C), preferably between 0.08% and 0.15% carbon (C),
from 0.3 to 1% manganese (Mn), preferably between 0.4% to 0.8% manganese (Mn),
from 1.4% to 3% silicon (Si), preferably between 1.5% and 2.5% silicon (Si),
from 0.5 to 3% copper (Cu), preferably between 0.5% and 2% copper (Cu),
from 8 to 10% chrome (Cr),
from 0.5 to 3% nickel (Ni), preferably between 0.5% and 2.7% nickel (Ni),
from 0.01 to 0.07% nitrogen (N), preferably between 0.02% and 0.05% nitrogen (N).
from 0.8 to 1.1% molybdenum (Mo),
from 0 to 0.04% aluminum (Al), preferably between 0.005% and 0.03% aluminum (Al),
the remainder of the composition comprising iron (Fe) and impurities such as phosphorus (P) between 0 and 0.025%, sulfur (5), between 0 and 0.02%, titanium (Ti) between 0 and 0.02%, niobium (Nb) between 0 and 0.05%, vanadium (V) between 0 and 0.05%, tungsten (W) between 0 and 0.1% and or cobalt (Co) between 0 and 0.05%.

In one embodiment of the invention, the percentages by weight of silicon (Si), copper (Cu) and nickel (Ni) comply with the following inequalities:

$$Si<1.5*(0.3Cu+Ni) \text{ for } Si<2.5\%;$$

$$2*Si<1.5*(0.3Cu+Ni) \text{ for } Si\geq2.5\%;$$

and $$Cu<Ni$$

Another object of the invention is a tubular component, at least one part of which has a steel composition according to one of the embodiments of the steel composition according to the invention.

In one embodiment, another object of the invention is a tubular component, the part of which having a steel composition according to one of the embodiments of the steel compositions according, to the invention is designed to be placed in contact with atmosphere containing coke.

Other characteristics, details and advantages of the invention will be seen from the following detailed description, and the appended drawings in which.

The drawings and the following description essentially contain elements of a certain nature. They form an integral part of the description, and may therefore not only be used to understand the present invention better, but also possibly to contribute to the definition thereof.

More particularly, the present invention concerns manufacturing tubular components of refinery furnaces. However, the steel composition can be utilized for manufacturing other elements likely to be exposed to coking phenomena.

Figures 2, 3:
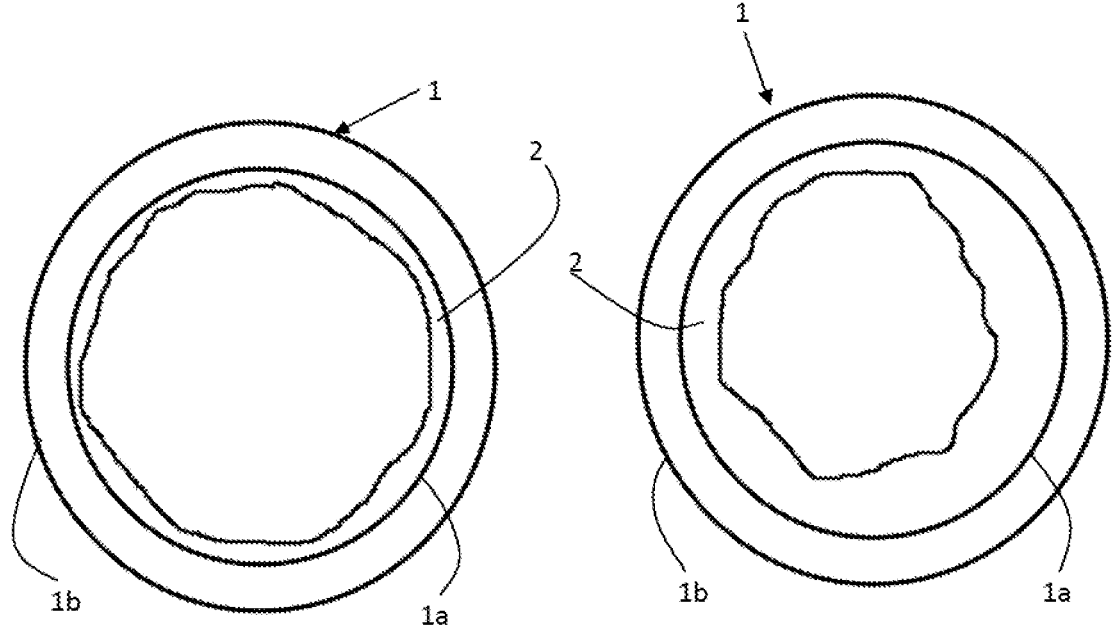
FIG. 2 is a schematic representation of a transverse cross-section of a tubular component subject to homogeneous coking phenomena.
FIG. 3 is a schematic representation of a transverse cross-section of a tubular component subject to heterogeneous coking phenomena.
Figure 1:
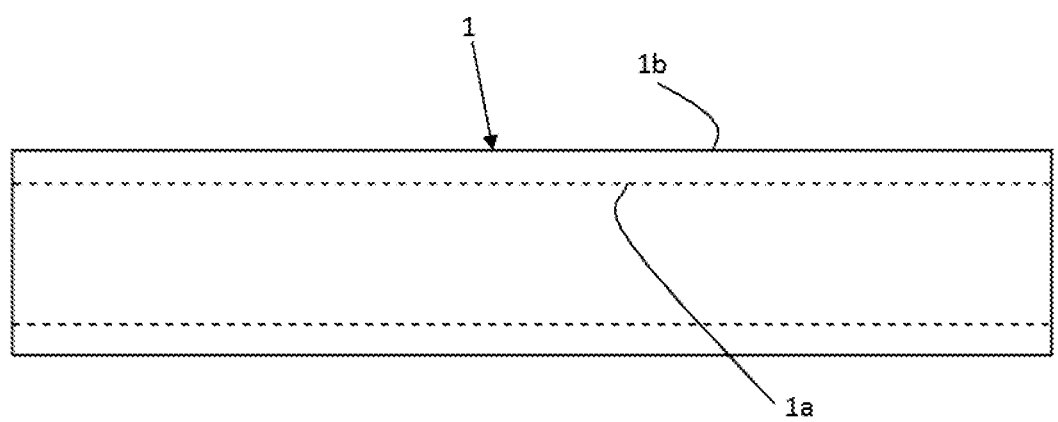
FIG. 1 is a representation of a tubular component according to the invention.

FIG. 1 represents a tubular component according to the invention, FIG. 2 is a transverse cross-section of the component of FIG. 1 after essentially homogenous exposure to coking, corresponding for example to a tubular component extending essentially vertically. FIG. 3 is a transverse cross-section of the component of FIG. 1 after essentially heterogeneous coking, corresponding for example to a tubular component extending essentially horizontally.

Each tubular component is referenced 1. Each internal surface is referenced 1a and each external surface is referenced 1b. The carbonaceous deposits are referenced 2. For each of the tubular components 1 of FIGS. 2 and 3, the carbonaceous deposit 2 is initiated on a surface of the steel subjected to contact with fumes containing carbon. In the examples described here, the internal surface 1a of the tubular component 1 is subjected to the passage of carbon-containing fumes. The carbonaceous deposit 2 is initiated on the internal surface 1a of the tubular component 1 then grows, reducing the free space inside the tubular component 1.

The Applicant has performed comparative tests on different steel samples to determine their performance in resistance to coking and their mechanical properties. The test protocols used are described below.

The chemical compositions of the tested steels are given in the following table 1. Values are expressed in percentage by weight.

TABLE 1

| Lot | C | Mn | Si | Cu | Cr | Ni | N | Mo | Almax | P | S | Ti | Nb |
|---|---|---|---|---|---|---|---|---|---|---|---|---|---|
| 1* | 0.11 | 0.40 | 0.28 | 0.10 | 8.43 | 0.09 | 0.02 | 0.97 | 0.005 | 0.005 | 0.004 | 0.002 | 0.009 |
| 2* | 0.11 | 0.39 | 1.02 | 0.10 | 8.27 | 0.09 | 0.02 | 0.95 | 0.004 | 0.005 | 0.004 | 0.002 | 0.008 |
| 3* | 0.11 | 0.39 | 2.02 | 0.01 | 8.16 | 0.09 | 0.03 | 0.93 | 0.005 | 0.005 | 0.003 | 0.002 | 0.008 |
| 4* | 0.11 | 0.97 | 1.96 | 0.11 | 8.26 | 0.10 | 0.02 | 0.90 | 0.006 | 0.005 | 0.004 | 0.002 | 0.008 |
| 5 | 0.11 | 0.39 | 1.98 | 1.02 | 8.51 | 0.97 | 0.02 | 0.93 | 0.004 | 0.005 | 0.004 | <0.012 | 0.007 |
| 6* | 0.11 | 0.42 | 2.50 | 0.11 | 8.27 | 0.09 | 0.02 | 0.86 | 0.006 | 0.005 | 0.003 | 0.003 | 0.009 |
| 7 | 0.1 | 0.5 | 1.48 | 0.99 | 8.76 | 0.95 | 0.03 | 1.01 | 0.002 | 0.015 | 0.007 | <0.012 | <0.014 |
| 8 | 0.1 | 0.5 | 2.49 | 2.06 | 8.89 | 2.56 | 0.03 | 1.01 | 0.002 | 0.015 | 0.007 | <0.012 | <0.014 |

TABLE 1-continued

| Lot | C | Mn | Si | Cu | Cr | Ni | N | Mo | Almax | P | S | Ti | Nb |
|---|---|---|---|---|---|---|---|---|---|---|---|---|---|
| 9 | 0.09 | 0.42 | 2.01 | 0.50 | 8.90 | 1.45 | 0.03 | 1.02 | 0.01 | 0.015 | 0.007 | <0.012 | <0.014 |
| 10 | 0.1 | 0.5 | 1.98 | 1.50 | 9.08 | 0.55 | 0.04 | 1.02 | 0.01 | 0.015 | 0.007 | <0.012 | <0.014 |
| 11* | 0.1 | 0.51 | 3.54 | 2.55 | 8.86 | 5.02 | 0.03 | 0.99 | 0.01 | 0.015 | 0.007 | <0.012 | <0.014 |

*Comparative examples

Sample 1* presents a steal composition chosen by the Applicant as basis for comparison, a conventional composition of a type P9 steel as defined in the ASTM A335 standard.

Samples 2* and 3* present compositions similar to that of sample 1* except for their content by weight of silicon (Si), which is respectively about 1% and 2%.

Sample 4* presents a composition similar to that of sample 1* except for their content by weight of silicon (Si) and manganese (Mn), which are respectively about 2% and 1%.

Reference 5 presents a composition according to the invention tested by the Applicant prior to the series of tests referenced 7 to 11, having a content by weight of silicon of about 2% and a content by weight of copper of about 1%.

Reference 6* presents a composition similar to that of sample 1* except for the content by weight of silicon (Si) which is about 2.5%. The copper content of sample 6* is reduced compared to sample 5.

References 7 to 11 correspond to steel compositions produced afterwards.

The measurements of contents by weight of chemical elements were verified:
for the nitrogen (N), by thermal conductivity after melting;
for the carbon (C) and sulfur (S), by infrared analysis of the gases after combustion;
for the other chemical elements, by spark spectroscopy (so-called "Spark-OES").

Each of the measurement techniques used is accredited by a French accreditation agency called COFRAC (Comité Français d'Accréditation [French Accreditation Committee]), except for those for the measurement of silicon (Si); copper (Cu) and nitrogen (N).

The chemical elements at the left of table 1 (C, Mn, Si, Cu, Cr, Ni, N, Mo, Al) are alloy (or additive) elements deliberiately added to the iron (Fe).

The chemical elements at the right of table 1 (P, S, Ti, Nb) are here considered as impurities.

The impurities are deliberately maintained at the lowest possible content by weight either because they have a negative effect on the desired properties, or because they have an essentially neutral effect on the desired properties, or because they represent a raw material cost that is too high for use at the industrial scale, or because the Applicant wished to study the effects of additive chemical elements in particular without the contents of impurities interfering with the results, or for a combination of these reasons.

In general, it is preferable that the contents of phosphorus (P) and sulfur (S) be as low as possible. The mechanical properties are improved as a result. Phosphorus is a residual element. Its presence is not required because it contributes to temper embrittlement, and is harmful to the impact toughness of the steel obtained. Phosphorus increases the hardenability. Sulfur contributes primarily to the formation of sulfides which reduce the forgeability, ductility, and impact toughness, particularly in the transverse direction, of the steel obtained. For example, the steel compositions do not comprise more than:
0.025% phosphorus (P), and preferably no more than 0.022% phosphorus,
0.02% sulfur (S), and preferably no more than 0.015% sulfur.

For example, the steel compositions do not comprise more than:
0.02% titanium (Ti),
0.05% niobium (Nb), Samples were produced from a vacuum induction furnace. The ingots obtained were then cut into blocks, wrapped in aluminum sheet to reduce oxidation during the following forming step, comprising heating to 1100° C. to prevent the appearance of fayalite, then rolling in six passes, with a thickness reduction from 80 mm to a thickness of 25 mm, the initial temperature being 1100° C. and the temperature during the last rolling pass then being 900° C. The dimensions of the samples obtained were 400×125×25 mm.

Preliminary investigations were carried out in order to detect any defects such as cracks, holes, as well as the presence of inclusions (counting per the ASTM E45 standard, method D). The samples obtained are free of defects, particularly of B and C type inclusions which are detrimental to the impact toughness.

The samples then underwent dilatometric measurements to determine heat treatment temperatures Ac1 and Ac3, using Bähr DIL 805 D equipment, and with the following temperature cycle: heating at 0.5° C./s, holding at 1100° C. for 5 minutes, and cooling at a rate of 1° C./s to ambient temperature.

The samples are then subjected to normalizing heat treatment followed by tempering heat treatment. The normalizing temperatures used are 30° to 50° C. higher than the Ac3 temperatures obtained by the dilatometric measurements, in order to eliminate the as-rolled microstructure. The temperatures are not increased by more than 50° C. in order to prevent the enlargement of the austenite grains. The tempering temperatures applied are 60° C. lower than the Ac1 temperatures obtained from the dilatometric curves, in order to prevent the appearance of austenite.

For some samples, additional or alternative heat treatments were tested, either by increasing the normalizing temperature, and/or the addition of a normalizing step, and/or by cooling in water instead of cooling in air.

These heat treatments are summarized in table 2 below for the steel compositions according to the invention.

TABLE 2

| | Heat treatment | | | | | |
|---|---|---|---|---|---|---|
| | Normalizing | | | Tempering | | |
| Steel | Temperature | Duration | Cooling | Temperature | Duration | Cooling |
| 3* | 980° C. | 15 min | Air | 820° C. | 120 min | Air |
| 5 | 905° C. | 15 min | Air | 760° C. | 120 min | Air |
| 6* | 1020° C. | 15 min | Air | 820° C. | 120 min | Air |
| 7 | 970° C. | 15 min | Air | 710° C. | 120 min | Air |
| | | | | 740° C. | 120 min | Air |
| | | | | 760° C. | 120 min | Air |
| 8 | 970° C. | 15 min | Air | 640° C. | 120 min | Air |
| | | | | 670° C. | 120 min | Air |
| | | | | T1: 780° C. | 120 min | Air |
| | | | | T2: 670° C. | | |
| | 1020° C. | | | 670° C. | 120 min | Water |
| | 1060° C. | 15 min | | 670° C. | 120 min | Water |
| | 1020° C. | 15 min | | Isothermal annealing 700° C./60 min | | |
| 9 | 1020° C. | 15 min | Air | 710° C. | 120 min | Air |
| | | | | 740° C. | 120 min | Air |
| | | | | 760° C. | 120 min | Air |
| | | | | 760° C. | 120 min | Water |
| | | | | 760° C. | 180 min | Water |
| | 1060° C. | | | 760° C. | 120 min | Wafer |
| 10 | 990° C. | 15 min | Air | 760° C. | 120 min | Air |
| | | | | 780° C. | 120 min | Air |
| | | | | 800° C. | 120 min | Air |
| | 1020° C. | | | 800° C. | 120 min | Water |
| | 1060° C. | | | 800° C. | 120 min | Water |
| 11 | 920° C. | 15 min | Air | 570° C. | 120 min | Air |
| | | | | 600° C. | 120 min | Air |
| | | | | T1: 750° C. | 120 min | Air |
| | | | | T2: 600° C. | | |

Samples 8 and 11 underwent tempering in two steps in order to test the influence of this heat treatment on lowering the mechanical properties of these steels.

Manufacturing each of the samples involves producing a steel casting, and thus the use of very large facilities. The tests, particularly those extending over long periods of time and/or carried out with high precision measuring machines, are particularly costly. It will be understood that to obtain conclusive results for a high number of compositions is unreasonably long, difficult, and expensive.

Coking Tests

Figure 5:
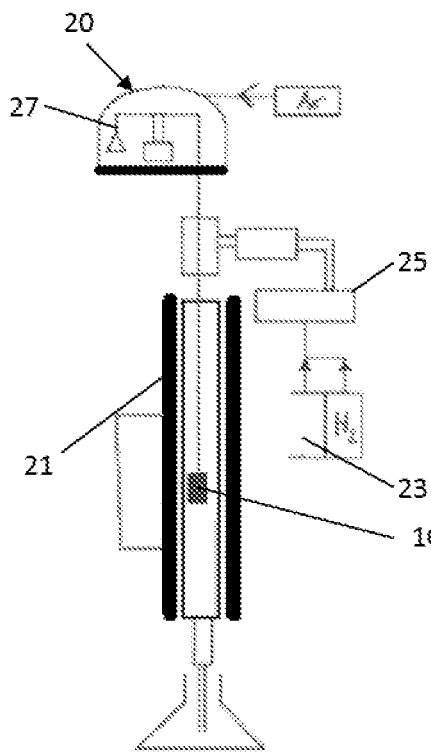
FIG. 5 is a schematic representation of a coking resistance test bed.

An experimental protocol was implemented to obtain the results of table 3 below. The measurements are made by means of a thermogravimeter 20, schematically represented in FIG. 5.

In the examples described here, the samples 100 are parallelepiped-shaped ingots measuring about 10 mm×5 mm×2 mm. A 1.8 mm diameter hole is made in each sample 100 in order to facilitate its connection to the thermogravimeter 20.

Before being placed in the thermogravimeter 20, each sample 100 is ground. For this, a silicon carbide sandpaper having average gain size of about 10.3 μm referenced "SIC 2000," is used. Grinding allows removal of oxidation and/or any dirt. The sample is then degreased by cleaning with acetone in an ultrasonic bath.

Thermogravimetry makes it possible to continuously measure the mass of the sample 100. The thermogravimeter 20 used here is a "SETARAM TG92." It has a precision of one microgram over a range of 0 to 20 g with an uncertainty of about 2%.

Each sample 100 is placed in a heated quartz reactor, or furnace 21, and suspended from a weighing module 27 of the thermogravimeter 20. The temperature of the furnace is regulated to ±10° C. The temperature is essentially constant at the location of the sample 100. As shown in table 2, the tests were carried out respectively at 650° C. and 700° C.

The sample 100 is suspended by means of an iron-chrome-aluminum (FeCrAl) alloy wire known by the tradename "Kanthal."

The sample 100 is immersed in a gaseous environment containing a mixture of a compound called 'Naphtha' referenced 23, and dihydrogen ($H_2$).

The naphtha 23 used here has the tradename "Naphtha IFPEN 7939." The composition by weight of the naphtha 23 is as follows:
  48.5% paraffin,
  36% naphthene,
  11.1% aromatic compounds,
  4.3% toluene, and
  0.1% benzene.

The density of the naphtha 23 used here is about 0.75 g/cm$^3$. The molar mass is about 112.1 g per mole. The characterization factor introduced by Universal Oil Products Company (generally noted $K_{UOP}$) is 11.9.

The naphtha 23 is introduced in liquid form then vaporized in an evaporator 25 of the thermogravimeter 20. The temperature of the evaporator 25 and the distribution ducts is about 200° C. The experimental conditions are selected in such a way that the molar ratio of the dihydrogen to the naphtha 23 is about 4.

The flow rate of the liquid naphtha 23 is about 2 mL per hour. The flow rate of the dihydrogen is about 1.2 L per hour (or 20 mL/min). The naphtha 23 is decomposed by reaction with the hydrogen to form the feed. In the experiment, said feed replaces the carbonaceous fumes or fluids of the real conditions. Under the conditions of the experiment, a feed flow rate in gaseous form of about 72 L per hour is injected into the furnace 21.

To protect the weighing module 27, a flow of argon (Ar) is continuously generated in the furnace 21. The argon (Ar) flow has a minimum rate of about 50 mL per minute being added to the flow rate of the charge. The argon (Ar) is injected from the weighing module 27 so as to form a gaseous cushion occupying the space to prevent the feed in gaseous form from coming into contact with the weighing module 27.

The changes in the mass, associated with the changes in the coke deposit, are then measured during a selected period of time. Here, the duration of the tests is 5 hours or 18 hours. The measurement of the mass is performed continuously over these 18 hours.

Table 3 below shows the results of resistance to coking of the samples, the chemical composition of which is provided in table 1. "N.A." means "not applicable," because it is unavailable or "Not Available". The results are expressed in mass normalized per unit of surface of the sample 100 (coking level in grams per square meter) regarding the coking level at a given moment; and expressed in mass normalized per unit of surface of the sample 100 and per hour (coking level in gams per square meter per hour) regarding the coking rate.

initial coking rate is a little higher than sample 3*, with 6.6 g/m² h compared to 4.6 g/m²h; however, the coking level at five hours is about the same, around 5 g/m². The initial coking rate seems to be greater or is maintained a little longer than for sample 3*. According to these tests, manganese does not seem to allow reduction of the coking phenomenon.

Sample 5 comprises 2% silicon, like the sample 3*, and further comprises 1% copper and 1% nickel. At 650° C., the initial coking rate is more than three times lower than that of sample 3*, at only 1.1 g/m²h. The coking level at five hours is also reduced by nearly 3 times. The addition of copper and nickel therefore makes it possible to reduce the coking phenomenon significantly, from its initiation. At 700° C., the initial coking rate is 25% lower than for sample 3*, and 10 times less than the reference sample 1*.

Sample 7, which corresponds to sample 5 with only 1.5% silicon, shows very good results at 650° C., with an initial coking rate again divided by two compared to that of sample 5, but an initial coking rate at 700° C. that is higher than that of sample 5, with 11.5 g/m²h compared to 3.6 g/m²h. However, this coking rate is still satisfactory because it is well below those of reference samples 1* and 2*; and this

TABLE 3

| | At 650° C. | | | | | At 700° C. | | | | |
|---|---|---|---|---|---|---|---|---|---|---|
| Steel | Initial rate (g/m²h) | Rate at 5 h (g/m²h) | Coking level at 5 h (g/m²) | Rate at 18 h (g/m²h) | Level at 18 h (g/m²) | Initial rate (g/m²h) | Rate at 5 h | Coking level at 5 h (g/m²) | Rate at 18 h (g/m²h) | Level at 18 h (g/m²) |
| 1* | / | | / | / | / | 38 | 9.5 | 88 | / | / |
| 2* | / | / | / | / | / | 27 | 2.7 | 35 | / | / |
| 3* | 3.7 | 0.3 | 3.1 | / | / | 4.6 | 0.2 | 5 | / | / |
| 4* | 3.7 | 0.2 | 4 | / | / | 6.6 | 0.2 | 4.6 | / | / |
| 5 | 1.1 | 0.1 | 1.2 | / | / | 3.6 | 0.2 | 2.8 | / | / |
| 7 | 0.5 | 0.03 | <1.5 | 0.03 | 2.2 | 11.5 | 0.4 | 6 | 0.2 | 9.9 |
| 8 | 0.26 | 0.17 | 1* | 0.14 | 2.9 | 1 | 0.2 | 2 | 0.2 | 5.5 |
| 9 | 0.6 | 0.05 | 1* | 0.02 | 1.1 | 1.2 | 0.4 | 2.8 | 0.24 | 6.8 |
| 10 | / | / | / | / | / | 1.6 | 0.3 | 2.1 | 0.2 | 5.3 |
| 11* | 0.07 | 0.12 | 1* | 0.08 | 1.9 | 0.3 | 0.2 | 1.6 | 0.19 | 4.1 |

The basis of comparison is that of a standard P9 steel with an initial coking rate of 38 g/m²h and a coking level of 88 g/m² at the end of 5 hours at 700° C. P9 steel improved with 2% silicon or 3* steel of the prior art enables a significant improvement, with an initial coking rate of 4.6 g/m²h and a coking level of 5 g/m² at the end of 5 hours at 700° C., showing a very slow coking phenomenon at the end of 5 hours. At 650° C., the 3* steel has an initial coking rate of 3.7 g/m²h and a coking level of 3.1 g/m² at the end of 5 hours.

The higher the temperature, the greater the deposit of coke.

The test results of sample 2* and sample 3* show that the supplemental addition of silicon with respectively 1% and 2% silicon by weight makes it possible to significantly reduce the coking phenomenon, with an initial rate respectively close to one and one half times and close to eight times smiler than the reference sample 1*. Also, after 5 hours of testing, the coking rate is reduced to a very slow rate, of the order of 0.2 g/m²h. The silicon makes it possible to reduce the coking phenomenon—the more the silicon, the slower the coking.

Sample 4* comprises 2% by weight of silicon, like sample 3*, and also comprises 1% manganese. At 650° C., the initial rate is the same as for sample 3*, 3.7 g/m²h. At 700° C., the initial rate seems to drop very quickly because at the end of 5 hours, the coking level is relatively low, very near to that of sample 5. This test reveals that a low limit of the silicon content combined with nickel and copper seems to be reached in order to obtain an effect of reducing the coking phenomenon at a higher temperature. With a lower content of silicon, it is possible to obtain a resistance to the coking phenomenon equivalent to that of a steel having a higher silicon content. This sample shows the inhibiting effect of copper on coking. If the silicon results in reducing the initial coking rate, the effect of copper is to slow the coking rate of the sample quickly.

Samples 8 and 11* have high contents of silicon, copper and nickel, and show significant reductions of the coking phenomenon, with even sometimes very reduced initial rates as is the case for sample 11*. The improvement is large compared to the samples 1* to 4*, but the improvement is also significant compared to sample 7. However, the improvement is moderate compared to samples 10 and 9, particularly at a temperature of 700° C.

Sample 10, which comprises 1.98% silicon and 1.5% copper, as well as 0.55% nickel, shows in comparison with sample 3* that there is a synergistic effect in reduction of coking with the presence of 0.5% copper in the steel.

With respect to more general findings, at 650° C. all of the inventive samples tested show that they have excellent behavior as regards coking. At the end of five hours, the coking level is less than 1.2 g/m², less than that of the comparative composition 3*and it is 3.1 g/m².

At 700° C.: All of the steels of the invention always exhibit coking levels much lower than 1* and 2* from the start of the test, with a coking rate that decreases very quickly.

It will also be noted that the important performance criterion is the initial coking rate. Indeed, when the initiation of the coking deposit is achieved and a layer of coke covers a sample, the protective effect provided by the elements of the steel is naturally lessened. According to the test results, it seems that a coking rate of the order of 0.2 g/m²h corresponds to the minimum coking rate achievable when a layer of coke is formed on the wall of the sample at the end of 18 hours.

Mechanical Tests

The treated samples were subjected to mechanical tests. Charpy impact toughness tests were carried out. The experimental protocol used is based on the standards ASTM A370-15 for the preparation of the samples, and ASTM E23-12c for the Charpy tests.

Impact toughness is tested in the transverse direction according to standard ASTM E23-12c by shock test on a V-shaped notch by the Charpy method. The transverse direction was chosen because it is the most critical for a rolled steel tube. The tests are performed at temperatures of 20° C., 0° C., −30° C. It is also interesting for the steel to have a satisfactory toughness at low temperatures. The representative value of the impact toughness is the minimum absorbed energy for a given temperature and is given in Joules.

The results are compared with the requirements of the standard NF EN 10216-2, and with the comparative examples 3* and 6* as known in the prior art.

Table 4 below shows the impact toughness results of the samples, the chemical composition of which is provided in table 1. The table only provides the average of the measured energy for three tests, as required by the standard. The steels were tested with different heat treatments and for three test temperatures: 20° C., 0° C. and −30° C.

TABLE 4

| | Heat treatment | | | | | | Average energy/T ° C. | | |
|---|---|---|---|---|---|---|---|---|---|
| | Normalizing | | | Tempering | | | | | |
| Steel | T ° C. | Duration | Cooling | T ° C. | Duration | Cooling | −30° C. | 0° C. | 20° C. |
| 3* | 980° C. | 15 min | Air | 820° C. | 120 min | Air | 14 | 24 | 40 |
| 6* | 1020° C. | 15 min | Air | 820° C. | 120 min | Air | | | 14 |
| 5 | 905° C. | 15 min | Air | 760° C. | 120 min | Air | 30 | 39 | 51 |
| 7 | 970° C. | 15 min | Air | 710° C. | 120 min | Air | 41 | 67 | 96 |
| | | | | 740° C. | 120 min | Air | 42 | 64 | 93 |
| | | | | 760° C. | 120 min | Air | 40 | 67 | 98 |
| 8 | 970° C. | 15 min | Air | 640° C. | 120 min | Air | 9 | 4 | 9 |
| | | | | 670° C. | 120 min | Air | 17 | 14 | 17 |
| | | | | T1: 780° C. | 120 min | Air | | | 25 |
| | | | | T2: 670° C. | | | | | |
| | 1020° C. | 15 min | | 670° C. | 120 min | Water | | | 14 |
| | 1060° C. | 15 min | | 670° C. | 120 min | Water | | | 14 |
| | 1020° C. | 15 min | | Isothermal annealing 700° C. | 60 min | | | | 21 |
| 9 | 1020° C. | 15 min | Air | 710° C. | 120 min | Air | 21 | 36 | 53 |
| | | | | 740° C. | 120 min | Air | 77 | 43 | 56 |
| | | | | 760° C. | 120 min | Air | 19 | 51 | 54 |
| | | | | 760° C. | 120 min | Water | | | 75 |
| | | | | 760° C. | 180 min | Water | | | 61 |
| | 1060° C. | | | 760° C. | 120 min | Water | | | 82 |
| 10 | 990° C. | 15 min | Air | 760° C. | 120 min | Air | 22 | 39 | 56 |
| | | | | 780° C. | 120 min | Air | 20 | 34 | 48 |
| | | | | 800° C. | 120 min | Air | 20 | 26 | 50 |
| | 1020° C. | | | 800° C. | 120 min | Water | | | 46 |
| | 1060° C. | | | 800° C. | 120 min | Water | | | 66 |
| 8 | 970° C. | 15 min | Air | 640° C. | 120 min | Air | 9 | 4 | 9 |
| | | | | 670° C. | 120 min | Air | 17 | 14 | 17 |
| | | | | T1: 780° C. | 120 min | Air | | | 25 |
| | | | | T2: 670° C. | | | | | |
| | 1020° C. | 15 min | | 670° C. | 120 min | Water | | | 14 |
| | 1060° C. | 15 min | | 670° C. | 120 min | Water | | | 14 |
| | 1020° C. | 15 min | | Isothermal annealing 700° C. | 60 min | | | | 21 |
| 11* | 920° C. | 15 min | Air | 570° C. | 120 min | Air | 6 | 6 | 6 |
| | | | | 600° C. | 120 min | Air | 7 | 6 | 7 |
| | | | | T1: 750° C. | 120 min | Air | | | 14 |
| | | | | T2: 600° C. | | | | | |

The minimum average impact energy defined by the standard NF EN 10216-2 for this type of steel is a minimum of 40 J in the longitudinal direction at 20° C.; a minimum of 27 J in the transverse direction at 20° C.

Sample 3* has impact toughness results of 40 J in the transverse direction at 20° C.

Sample 6*, with 2.5% silicon, has a greatly deteriorated impact toughness of 14 J, well below the threshold required by the standard.

Sample 7 shows an impact toughness far higher than the comparative examples. The result at −30'C. is equal to or even greater than the performance at 20° C. of examples from the prior art. Furthermore, the values achieved at 20° C. fall well within the requirements of the standard NF EN 10216-2.

Sample 8 does not reach the impact toughness values meeting the requirements of the standard, but makes it possible to improve the impact toughness of the steel by doubling it in the transverse direction with 25 J at 20° C. instead of 14 J at 20° C. of sample 6*. The addition of nickel and copper therefore makes it possible to reduce the harmful effect of silicon on the impact toughness of the steel. However, the different tests show that a suitable heat treatment makes it possible to come very close to the requirement of the standard, and the steel 8 can meet the requirement of the standard.

Steel 10 has 1.98% Si, 1.5% Cu and 0.55% Ni. A very significant improvement is noted of the impact toughness, by a factor of 2 at 20° C. relative to the comparative steels 3* and 6* (respectively P9+2% Si, P9+2.5% Si). Sample 9, which has 2.01% Si, 0.5% Cu and 1.45% Ni, exhibits performance levels that are essentially the same as those of sample 10. Nickel and copper therefore make it possible to compensate for the greater amount of silicon and to increase the impact toughness of the steel. Nickel has a more important role in increasing the impact toughness than copper.

Sample 11* comprises high contents of silicon, nickel and copper, with 3.54% Si, 5.02% Ni, and 2.55% Cu. Depending on the heat treatment, a steel is obtained, the impact toughness of which is at best only at the level of a steel of the prior art, such as the steel 6*. An excessive proportion of silicon deteriorates the impact toughness of the steel, for which the addition of nickel and copper cannot compensate.

To summarize, in comparing the first test results corresponding to references 1 to 6, the Applicant has found that the addition of silicon (Si) essentially improves the coking performance. However, the addition of silicon (Si) also tends to reduce the impact toughness of the steel. Consequently, the addition of silicon (Si) is not sufficient to improve the coking resistance properties while preserving the mechanical properties of the steels.

Furthermore, the results obtained show that the reduction of coking as a function of the addition of silicon (Si) becomes low when the proportion of silicon (Si) increases (cf. references 1*, 2* and 3*).

The Applicant has carried out the same coking and impact toughness tests on a sample 5 of steel combining the addition of silicon (Si) with other chemical elements. The Applicant has found that the combined addition of silicon (Si), nickel (Ni), and copper (Cu) compared to reference 1 gave the steel not only improved coking resistance properties, but also improved the mechanical properties, and particularly the impact toughness relative to the comparative samples.

From the results obtained for reference 5 from tables 1 to 4, the Applicant has tried to confirm its findings by carrying out subsequent tests on the samples referenced 7 to 11 from tables 1 to 4.

The results obtained show that the combined presence of silicon (Si), copper (Cu) and nickel (Ni) make it possible to obtain steels, both the coking resistance and impact toughness properties of which are particularly advantageous.

In particular, the steel according to the invention comprises the following elements.

Carbon

Carbon is present tip to 0.15% by weight. Beyond that, the weldability of the steel is deteriorated. Preferably, the carbon content is greater than or equal to 0.08% by weight, in order to avoid the formation of delta ferrite. Below 0.08% the creep properties of the steel can be reduced. Again preferably the carbon content is equal to or greater than 0.09% and less than or equal to 0.11%.

Manganese

Manganese is a deoxidizes and desulfurizer of the steel when melted. Manganese improves the hardenability and consequently the strength of the final steel. When the manganese content is greater than 1.5%, it increases risk of forming manganese sulfide inclusions, which impair the impact toughness of the steel. Consequently, the manganese content is preferably between 0.3% and 1%, and preferably between 0.4% and 0.8%, for optimization of the compromise between the impact toughness of the steel and hardenability.

Silicon

Silicon with chrome is a deoxidizes of the steel. Silicon allows the formation of a protective oxide layer on the surface of the steel. Silicon and chrome form oxides $SiO_2$ and $Cr_2O_3$. This oxide layer forms a protective film against the coking phenomenon. However, silicon is an alpha stabilizer element, and it is known that the content thereof must be limited to prevent the formation of delta ferrite. When the content thereof is too high, it also promotes weakening precipitations in service. It is known to limit its content in steel to a maximum of 1% by weight.

During tests, the Applicant discovered that it was possible to go beyond this content while preserving acceptable mechanical properties for the steel, through the addition of nickel and copper.

Indeed, the coking rate of steels is greatly decreased while preserving the mechanical properties of the steel with a silicon content equal to or more than 1.4% by weight. Such effect is improved even more up to 3% by weight of silicon. Beyond this limit, it is no longer possible to maintain the qualities of the steel. The greatest effect is observed for a silicon content equal to or greater than 1.5% and less than or equal to 2.5%.

Chrome

Chrome plays an essential role in corrosion and oxidation resistance at high temperature. A minimum content of 8% is necessary to achieve the desired effects for use in a petroleum products treatment and transformation facility. However, the risk of formation of delta ferrite associated with the presence of chrome leads to limiting the chrome content to 10% in order not to affect the impact toughness of the steel.

Nitrogen

Nitrogen is a gamma stabilizer element contributing to the formation of austenite, and making it possible to reduce the formation of delta ferrite (δ ferrite) which impairs the impact toughness of the steel. Nitrogen also enables nitrides generation that are more stable and smaller than the carbide equivalents. In order to limit the risks of defects, such as blowholes in the ingots or billets, or during welding operations, it is preferable to limit the nitrogen content to a value between 0.01% and 0.07%, and preferably between 0.02% and 0.05%.

Molybdenum

Molybdenum improves the hardenability of the steel, and particularly the effectiveness of softening during tempering. Molybdenum reduces the slope of the tempering curve, and facilitates control of the heat treatment. To that end, a minimum molybdenum content of 0.8% is required. However, an excessive content of molybdenum could cause the generation of molybdenum oxide $MnO_3$, which is not stable at high temperature and inhibits good corrosion resistance at high temperature. Molybdenum is also a delta ferrite generator, affecting the impact toughness of the steel. For these reasons, it is preferable to limit the molybdenum content to 1.1%.

Nickel

Nickel is a gamma stabilizer element and it slows the appearance of ferrite. Ferrite impairs the impact toughness properly of the steel. Moreover, nickel promotes austenite phase formation. The tests have shown that the addition of nickel to a steel having the concentration of silicon described above leads to a high impact toughness. The Applicant has noted with surprise that it also participates in reducing the coking phenomenon. These effects are obtained from 0.5% by weight of nickel in the steel, and up to 3% by weight, preferably up to 2.7% by weight. Beyond that, the impact toughness of the steel obtained is unsatisfactory.

Copper

Copper is an important element of the invention. The Applicant was surprised to discover that it was possible to improve the coking resistance of the steel still even more by the addition of copper.

Copper slows down or even suppresses dissociation of carbon and oxygen in steel. Copper also slows down diffusion of carbon in the steel and coking.

The combination of the presence of copper in addition to the presence of silicon in the steel considerably slows the coking of a wall: when defects such as cracks appear in the oxide layer, the coking phenomenon is slowed by the presence of copper at this defect. These two effects act in synergy to obtain a coking resistance of the steel that is considerably improved.

These effects are obtained from a concentration equal to or greater than 0.5% by weight of copper and up to 3% by weight of copper. Beyond that, the effect of copper is limited. Preferably, the maximum copper content is 2% by weight.

Aluminum

This element is not necessary in order to obtain the desired metallurgical characteristics within the scope of the invention, and it is here considered to be a production residual: its addition therefore remains optional. It is a strong deoxidizer of the metal. Aluminum is also an alpha phase stabilizer element and has a high affinity for nitrogen, aluminum contents of more than 0.04% are unfavorable. Depending on needs, if necessary aluminum can be added to obtain a final content ranging up to 0.04%, and preferably a final content between 0.005 and 0.03%.

Figure 4:
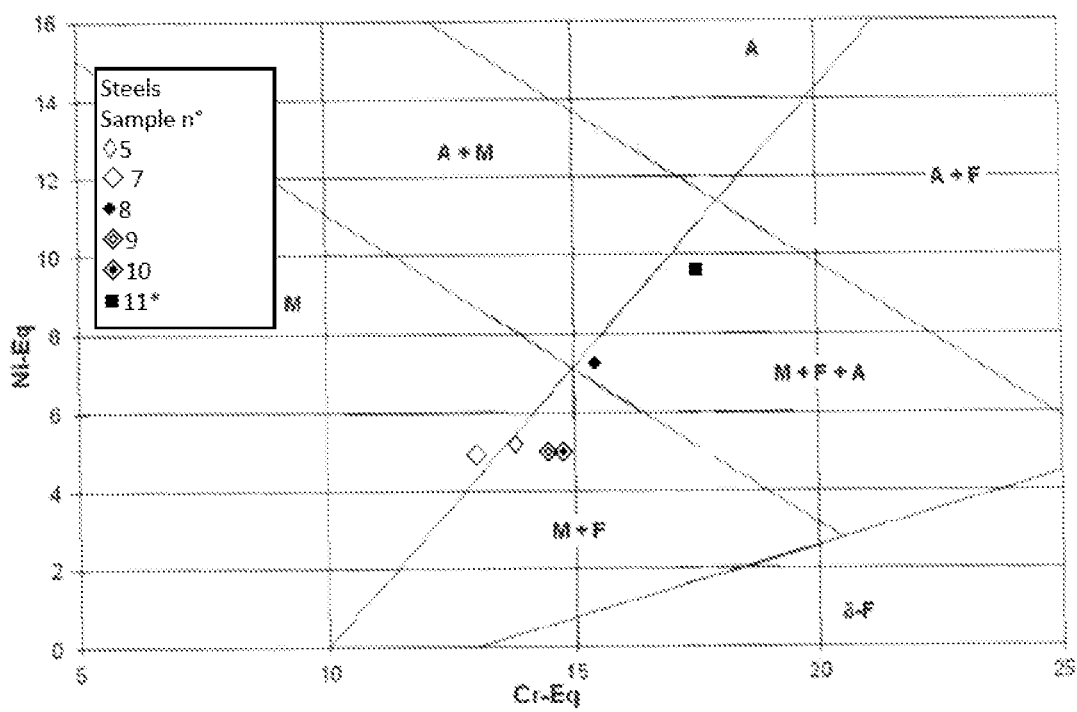
FIG. 4 is at Schaeffler diagram.

FIG. 4 displays a Schaeffler diagram. In this diagram, the abscissa represents the content of the alpha phase stabilizing elements of the steel called "chrome equivalent." The formula defining the chromium equivalent content is provided below. The ordinate represents the content of the gamma phase stabilizing elements of the steel called "nickel equivalent." The formula defining the nickel equivalent content is provided below.

$$Cr_{eq}=Cr+2*Si+1.5*Mo+5*V+5.5*Al+1.75*Nb+1.5*Ti+0.75*W$$

$$Ni_{eq}=Ni+Co+30*C+0.5*Mn+0.3*Cu+25*N$$

By positioning each steel composition in such diagram, it is theoretically possible to predict the crystalline structure of said steel.

It is preferable to remain outside the ferritic domain of steels. The mechanical behavior and service life of steel parts degrade as the ferritic proportion increases in the martensitic structure. A ferritic structure is avoided when the chemical composition is such that at least one and preferably both of the following inequalities, expressed in percentages by weight, are respected:

$$Si<1.5*(0.3Cu+Ni) \text{ for } Si<2.5\%;$$

$$2*Si<1.5*(0.3Cu+Ni) \text{ for } Si\geq2.5\%;$$

and $$Cu<Ni$$

In other words, it is preferable that the content by weight of copper (Cu) be less than the content by weight of nickel (Ni), in order to improve the behavior of the steel during rolling.

The invention is not limited to the examples of steel compositions and tubular components described in the foregoing, solely by way of examples, but it encompasses all variants that may be envisioned by the person skilled in the art within the scope of the following claims.

The invention claimed is:

1. A tubular component adapted for use in furnace environments having temperatures of at least 600° C., the tubular component comprising a steel having a composition in percentage by weight:
   from 0.08 to 0.15% carbon,
   from 0.4 to 0.8% manganese,
   from 1.98 to 2.5% silicon,
   from 0.5 to 2% copper,
   from 8 to 10% chrome,
   from 0.5 to 3% nickel,
   from 0.01 to 0.07% nitrogen,
   from 0.8 to 1.1% molybdenum, and
   the remainder of the composition being iron and impurities, wherein the tubular component has a minimum average impact energy of 40 J in a longitudinal direction at 20° C.

2. The tubular component according to claim 1, the composition further comprising:
   no more than 0.04% aluminum,
   no more than 0.025% phosphorus,
   no more than 0.02% sulfur,
   no more than 0.02% titanium,
   no more than 0.05% niobium,
   no more than 0.05% vanadium,
   no more than 0.1% tungsten, and
   no more than 0.05% cobalt.

3. The tubular component according to claim 2, wherein the content by weight of each of aluminum, phosphorus, sulfur, titanium, niobium, vanadium, tungsten, and cobalt in the composition does not exceed 0.01%.

4. The tubular component according to claim 1, the composition comprising: from 0.09% to 0.11% of carbon.

5. The tubular component according to claim 1, the composition comprising: from 0.5% to 2.7% of nickel.

6. The tubular component according to claim 1, the composition comprising: from 0.02% to 0.05% of nitrogen.

7. The tubular component according to claim 2, the composition comprising: from 0.005% to 0.03% of aluminum.

8. The tubular component according to claim 1, the composition further comprising:
   no more than 0.025% phosphorus,
   no more than 0.02% sulfur,
   no more than 0.02% titanium,
   no more than 0.05% niobium,
   no more than 0.05% vanadium,
   no more than 0.1% tungsten, and
   no more than 0.05% cobalt.

9. The tubular component according to claim 1, the composition further comprising: phosphorus and sulfur as impurities.

10. The tubular component according to claim 1, wherein the percentages by weight of silicon [Si], copper [Cu], and nickel [Ni] in the composition satisfy:

$$[Si]<1.5*(0.3[Cu]+[Ni]) \text{ for} [Si]<2.5\%; \text{ and}$$

$$[Cu]<[Ni].$$

11. The tubular component according to claim 1, wherein at least one part of the steel having the composition is designed to be placed in contact with an atmosphere containing coke.

* * * * *

UNITED STATES PATENT AND TRADEMARK OFFICE
CERTIFICATE OF CORRECTION

PATENT NO. : 11,685,981 B2
APPLICATION NO. : 17/681065
DATED : June 27, 2023
INVENTOR(S) : Rossi et al.

It is certified that error appears in the above-identified patent and that said Letters Patent is hereby corrected as shown below:

In the Specification

In Column 1, Line 62, delete "brown" and insert -- known --, therefor.

In Column 4, Line 18, delete "at" and insert -- a --, therefor.

In Column 5, Line 50, delete "deliberiately" and insert -- deliberately --, therefor.

Signed and Sealed this
Fourteenth Day of November, 2023

*Katherine Kelly Vidal*

Katherine Kelly Vidal
*Director of the United States Patent and Trademark Office*